March 6, 1951 W. R. DODDS 2,544,447
APPARATUS FOR PRODUCING SHAPED SECTIONS
Filed Nov. 24, 1944 6 Sheets-Sheet 1

Inventor
William R. Dodds
Attorney

March 6, 1951 W. R. DODDS 2,544,447
APPARATUS FOR PRODUCING SHAPED SECTIONS
Filed Nov. 24, 1944 6 Sheets-Sheet 2

Inventor
William R. Dodds
Attorney

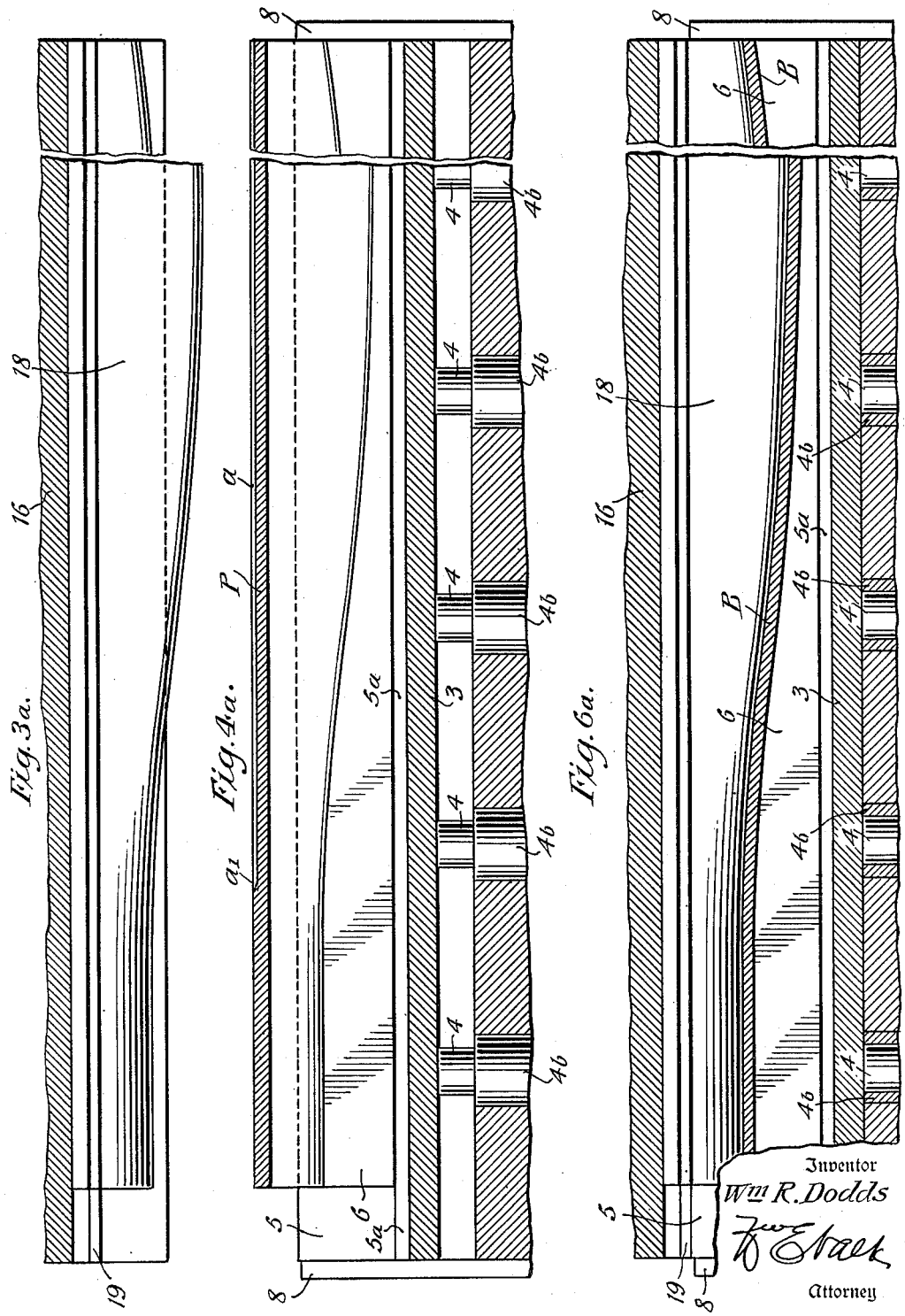

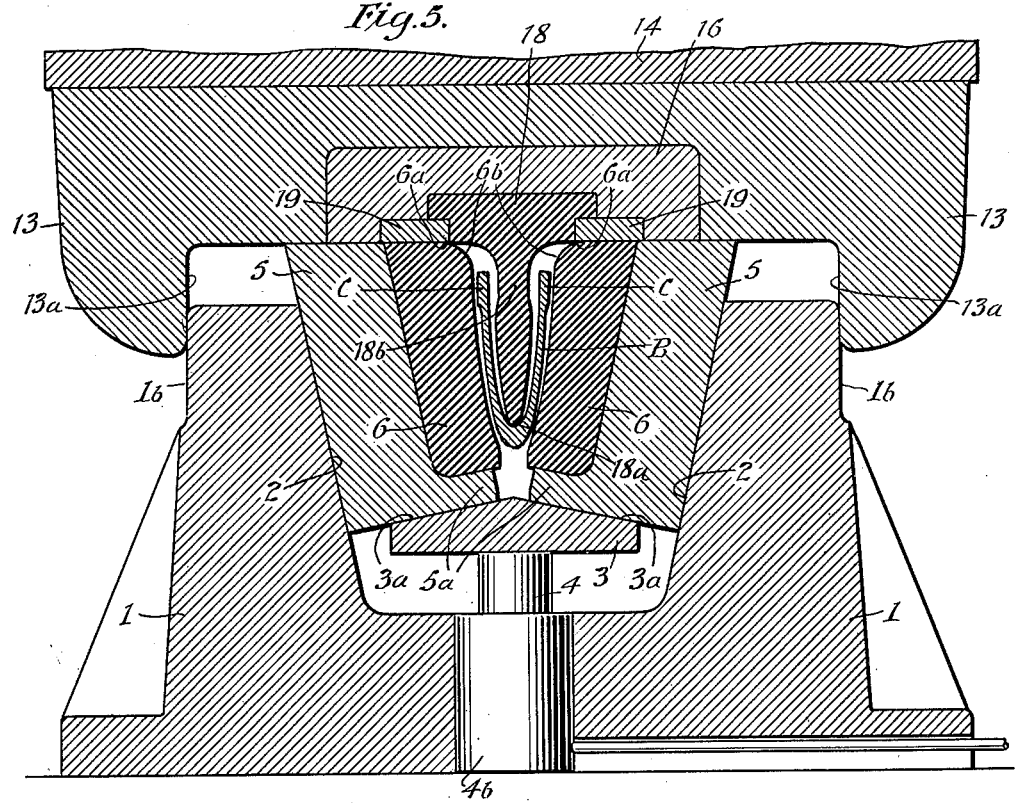
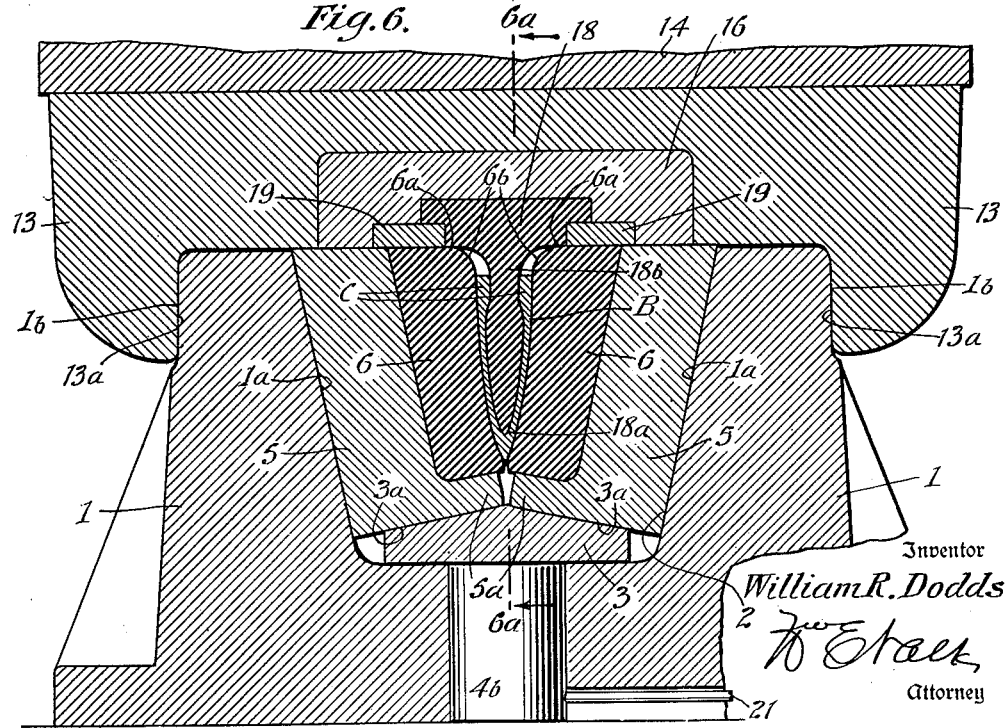

Inventor
William R. Dodds
Attorney

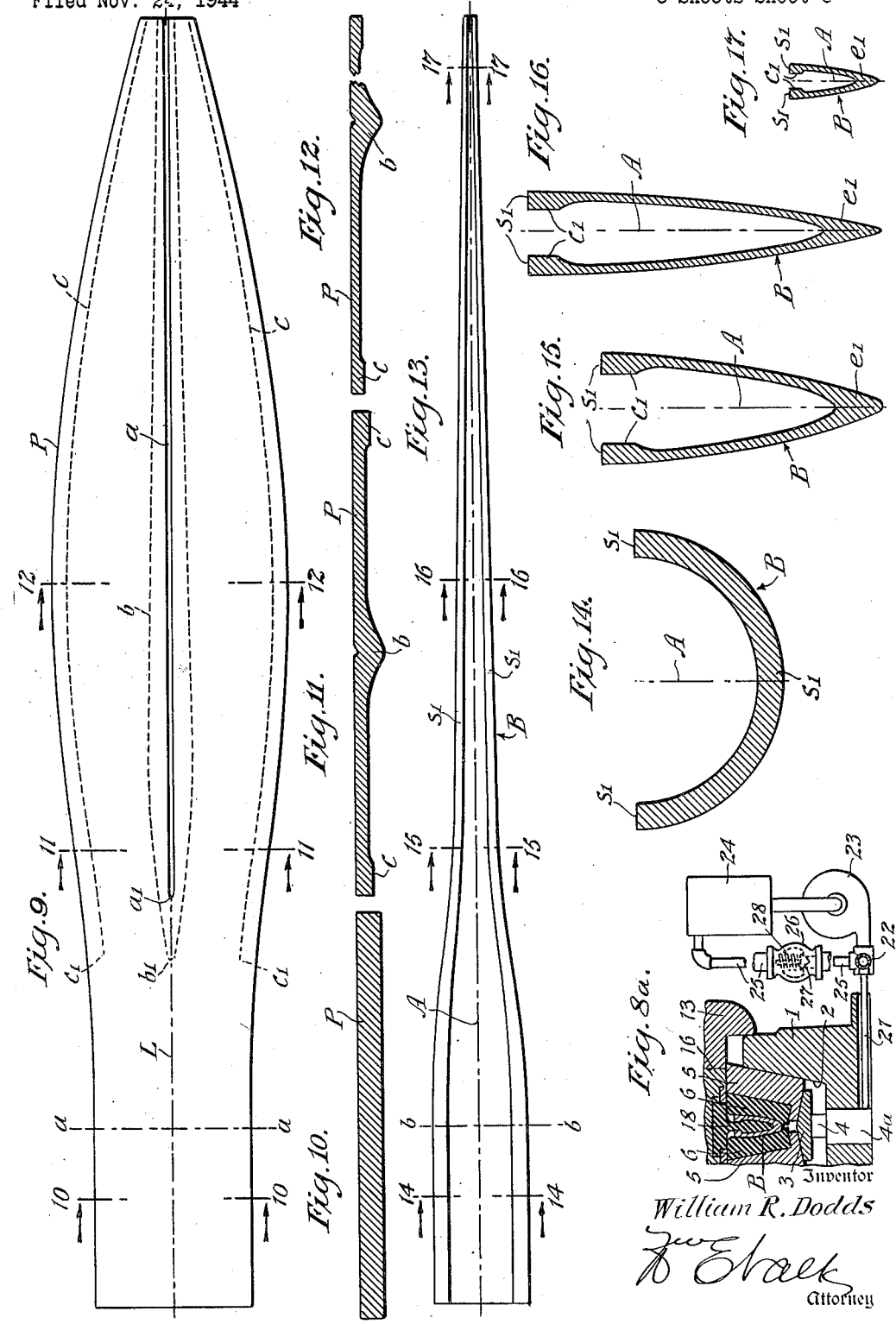

Patented Mar. 6, 1951

2,544,447

UNITED STATES PATENT OFFICE 2,544,447

APPARATUS FOR PRODUCING SHAPED SECTIONS

William R. Dodds, Paterson, N. J., assignor to Curtiss-Wright Corporation, a corporation of Delaware Application November 24, 1944, Serial No. 565,007

1 Claim. (Cl. 78—60)

My invention relates to an apparatus for producing shaped sections.

My invention has particular reference to a two-stage die press operative to produce a shaped section such, for example, as one forming a part of a propeller blade. In the first stage, the punch shoe and the die block sections of the die press coact to partially shape a plate or blank and, in the second stage, the recited elements coact to complete the shaped section.

Various other objects, advantages and features of my invention will become apparent from the following detailed description.

My invention resides in the die press utilizable for producing shaped sections, combinations and arrangements of the character hereinafter described and claimed.

For an understanding of my invention, reference is to be had to the accompanying drawings, in which:

Fig. 3a is a longitudinal, vertical sectional view, partly in elevation, taken on the line 3a—3a of Fig. 3 looking in the direction of the arrows;

Fig. 4a is a longitudinal, vertical sectional view, partly in elevation, taken on the line 4a—4a of Fig. 4 looking in the direction of the arrows;

Figs. 5 and 6 are transverse, vertical sectional views showing the die press in different operative stages;

Fig. 6a is a longitudinal, vertical sectional view, partly in elevation, taken on the line 6a—6a of Fig. 6 looking in the direction of the arrows;

Fig. 8a is a transverse, vertical sectional view, partly in elevation, illustrating a feature of the invention;

Fig. 9 is a plan view of a plate or blank destined to form a shaped section of a propeller blade;

Figs. 10, 11 and 12 are transverse, vertical sectional views taken on the respective lines 10—10, 11—11 and 12—12 of Fig. 9;

Fig. 13 is an elevational view showing the shaped section; and

Figs. 14, 15, 16 and 17 are transverse, vertical sectional views taken on the respective lines 14—14, 15—15, 16—16 and 17—17 of Fig. 13.

The disclosure of this application relates to the production of a shaped section which, as stated, may form a part of a propeller blade. Application Serial No. 564,980, filed Nov. 24, 1944, and now abandoned, relates to the formation of a propeller blade from a pair of such shaped sections.

In Figs. 9–12 inclusive, I have shown a plate or blank P which, except at the tipe end thereof, is destined to form one longitudinally extending half of a propeller blade. The plate P is symmetrical about its longitudinal center line L. The thickness thereof, throughout the length which will form the propeller blade shank section, is uniform and, at a suitable location $a$—$a$, the plate thickness starts to decrease and does decrease gradually until the plate tip is reached.

One face of the plate P is plane except for a longitudinally extending groove $a$ which extends from the tip of the plate toward the shank thereof and terminates at a suitable location such as $a1$, the provision of this groove $a$ being optional. The other face of the plate P is not plane since, as illustrated, it is defined in part by a central rib $b$ and fillets or thick sections $c$ at the respective plate edges. Between the rib $b$ and the respective fillets $c$, the plate P has uniform thickness throughout any transverse section.

The central rib $b$, with gradually varying width and varying height, extends from the tip of the plate P toward the shank thereof and at a suitable location $b1$, merges or blends into the plate surface. As shown in Fig. 9, the rib $b$ is symmetrical with respect to the plate center line L and, as indicated in Figs. 11 and 12, the height of said rib is greatest at said center line. On each transverse side of the center line, the height of the rib $b$ progressively decreases and, in a symmetrical manner, merges into the plate surface.

The fillets $c$, at the respective edges of the plate P, extend from the tip of the plate toward the shank thereof and, at suitable locations $c1$, the respective fillets merge into the plate surface. The width of each fillet $c$ gradually increases in a direction extending from the tip of the plate toward the shank thereof and, in said direction, the height of said fillets $c$ progressively increases in accordance with increase in plate thickness.

The plate P may be produced in any suitable manner. It may be milled from a plane sheet of metal but, preferably, it is produced by a forge rolling operation performed on a heated metal billet.

Figure 4:
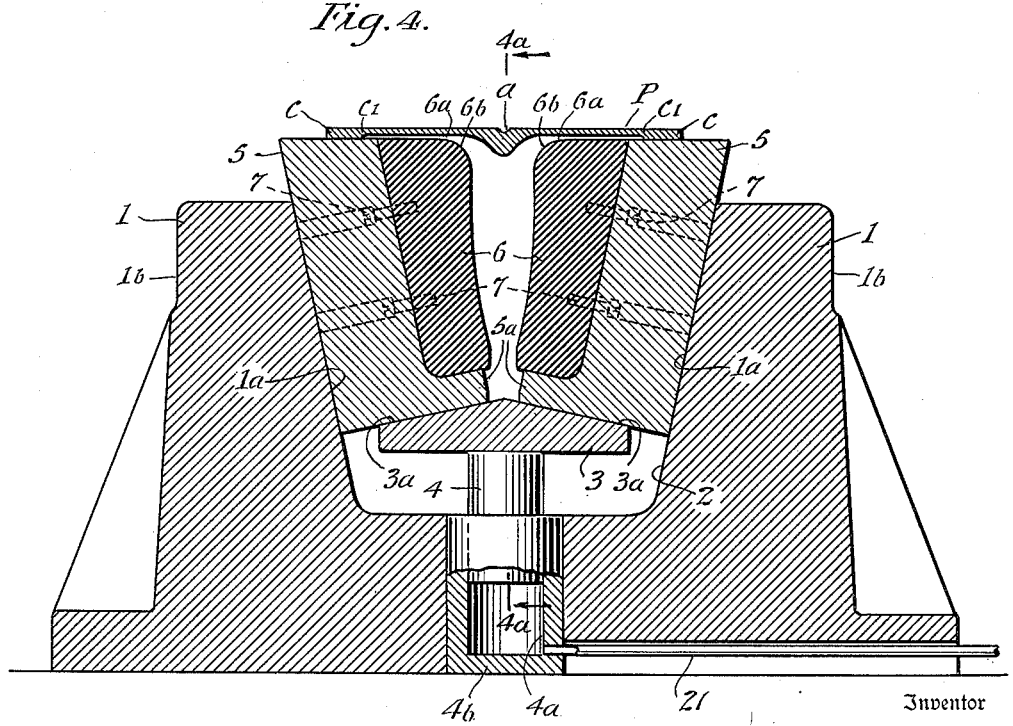
Fig. 4 is a transverse, vertical sectional view taken on the line 4—4 of Fig. 2 looking in the direction of the arrows.

Referring to Figs. 2, 4, 4a, 5, 6, 6a, 7 and 8, I have shown a die press which comprises a fixed die shoe 1 having a longitudinally extending channel 2 in which a follower plate, ejector bar or plunger 3 is disposed and movable vertically in the lower area thereof, said plunger 3 resting upon a plurality of spaced depending plunger rods or pistons 4 freely movable in vertical passages 4a provided respectively therefor in housings 4b seated in the die shoe 1. A pair of complementary backing blocks 5, 5 are disposed in the channel 2 and in engagement with the respective inclined surfaces 1a of the die shoe 1, said backing blocks 5, 5 seating upon the respective inclined surfaces 3a of the plunger 3. Each of the blocks 5 comprises a lateral extension 5a, these extensions facing each other and serving as seats for the respective die block sections 6, 6 which jointly form the die block of the die press. As indicated in Fig. 4, the die block sections 6, 6 are secured to the respective backing blocks 5, 5 by screws 7.

Figure 1:
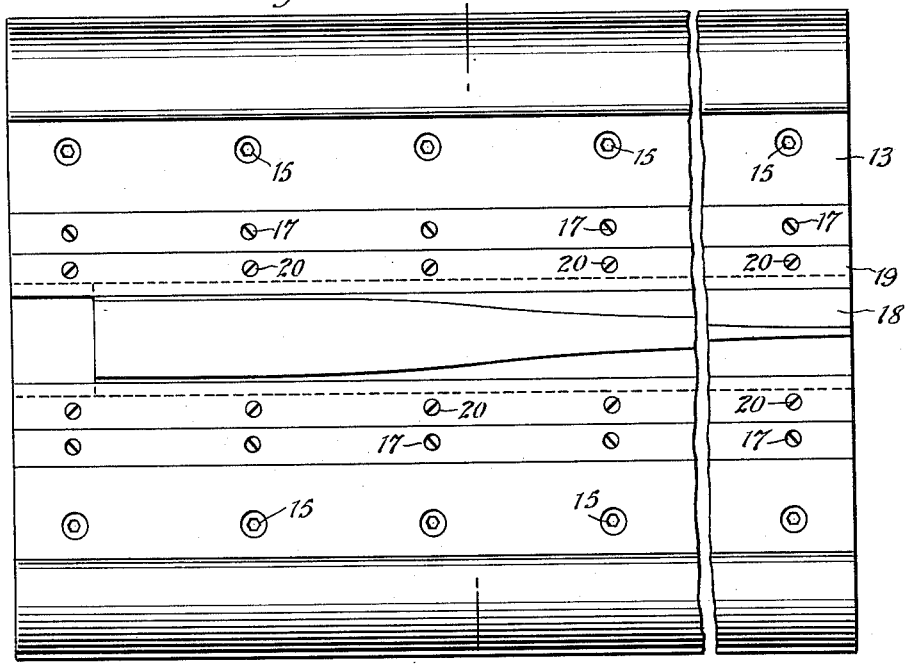
Figure 1 is a bottom plan view showing the movable structure of the die press.
Figure 2:
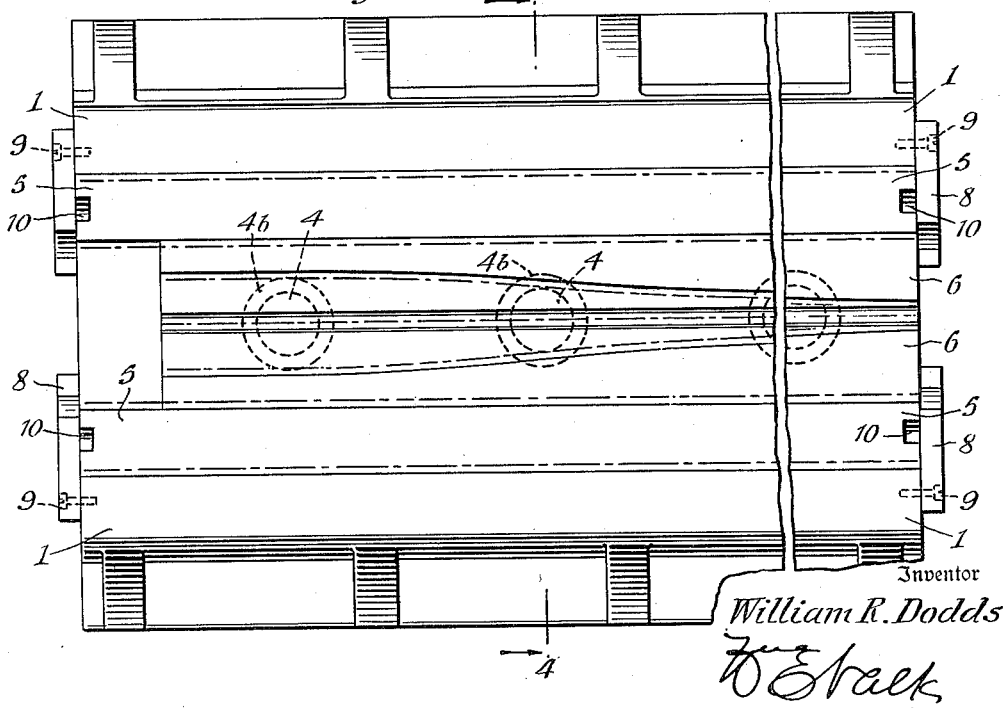
Fig. 2 is a top plan view showing the fixed structure of the die press.
Figure 7:
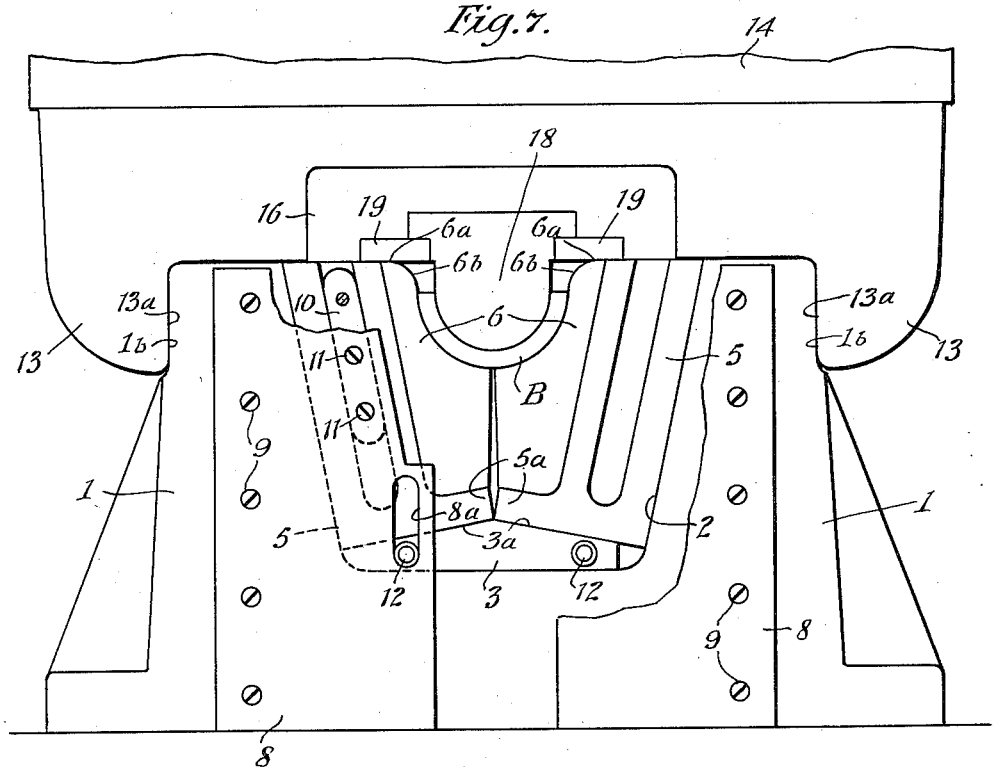
Fig. 7 is an end elevational view of the die press.
Figure 8:
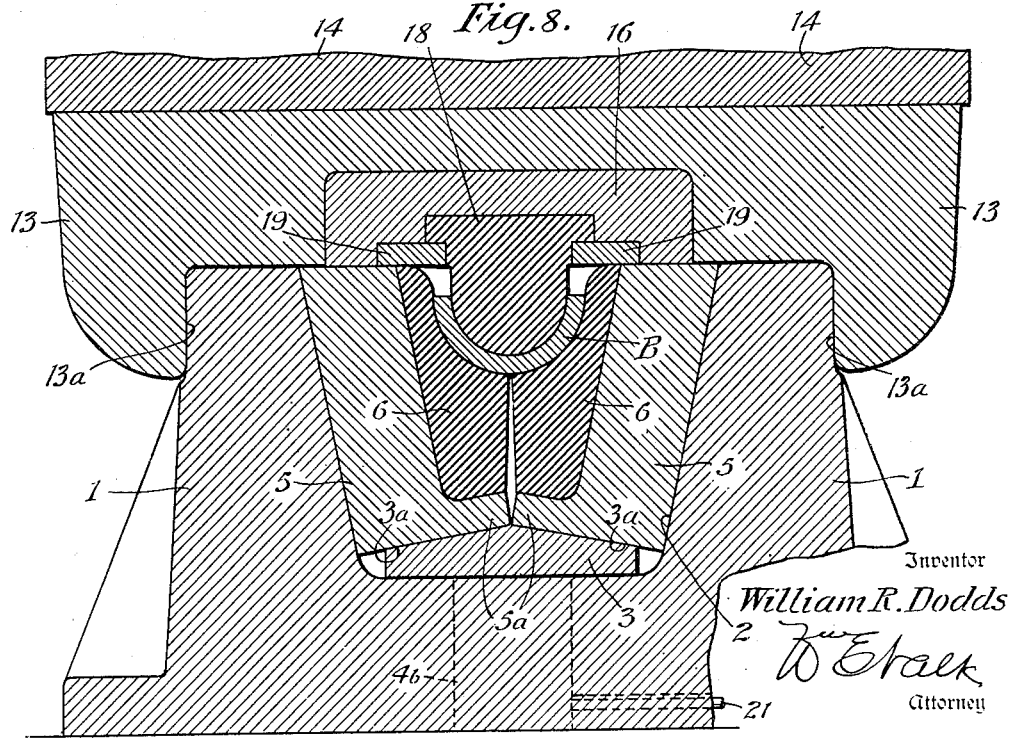
Fig. 8 is a transverse, vertical sectional view showing an operative stage of the die press corresponding with the stage illustrated by Fig. 6 but taken on a different plane.

As shown particularly in Figs. 2 and 7, each end of the die shoe 1 has a pair of spaced retaining plates 8 secured thereto by screws 9, or equivalent. A member 10 is secured to the interior surface of each plate 8 by screws 11 or the like and these members 10 are disposed in non-binding relation in inclined slots formed respectively therefor in adjacent surfaces of the respective backing blocks 5, 5. Each plate 8 also comprises a vertical slot 8a and each slot 8a receives, in non-binding relation, a pin 12 carried by and projecting from the aforesaid plunger 3.

Referring to Figs. 1, 3, 3a and 5–8 inclusive, the die press is shown further as comprising an upper movable die shoe 13 which is secured to an upper support 14 by screws 15, or equivalent. Disposed in a longitudinal channel formed in the die shoe 13 is a punch plate 16 which is secured to the die shoe 13 by screws 17, or equivalent. Seated in a longitudinal channel of the punch plate 16 is the base of the punch 18 which is flanked on its opposite respective sides by the gibs 19 secured to the punch plate 16 by screws 20, or equivalent.

Referring particularly to Figs. 1, 2, 3a, 4a and 6a, the aforesaid die block sections 6, 6 together with the punch 18 are all shown as having the same length which corresponds with the length of the aforesaid plate P. The die block sections 6 and 6, on the one hand, and the punch 18, on the other hand, are complementary with respect to each other. When the punch 18 is disposed in its final position, Fig. 6, said punch 18 together with the die block sections 6, 6 define a channel or pocket having the configuration which is to be finally imparted to the aforesaid plate P.

This configuration changes in a progressive manner from the shank of the plate to the tip thereof. As indicated in Figs. 3a, 4a, 6a, the punch 18 and the die block sections 6, 6 are adapted to form one end of the plate P into a hemi-cylindrical shank section which may extend as far as the line b—b, Fig. 13. Beyond the line b—b toward the right, Fig. 13, the punch 18 and the die block sections 6, 6 are adapted to impart non-cylindrical channel or U-shape to the plate P, the depth of the channel gradually increasing to a maximum adjacent the middle of the shaped plate and then gradually decreasing as the tip of the plate is approached. A typical cross-section indicative of this channel configuration is shown in Fig. 6. It will be understood, then, that the effective height of the punch 18 and the die block sections 6, 6 gradually increases to a maximum and then gradually decreases, Figs. 3a, 4a and 6a.

Referring to Fig. 8a, each of the aforesaid housing passages 4a is indicated as having a pipe 21 communicating therewith, the pipes 21 being connected to a header 22 connected, in turn, to a suitable pump 23 which is supplied with hydraulic liquid from a tank 24. A pipe 25 communicates with the header 22 and is adapted to discharge hydraulic liquid into the tank 24 at or adjacent the top thereof. The pipe 25 includes a valve housing 26 having disposed therein a valve 27 biased toward its seat, under predetermined pressure, by a spring 28 of such character that the valve opens in response to the development of a predetermined liquid pressure in that section of the pipe 25 which communicates with the header 22.

Before proceeding with the die-shaping operation, operation of the pump 23 is initiated to cause a predetermined liquid pressure to be effective in the housings 4b to thereby maintain the plunger 3 in its upper position. As a result, the backing blocks 5, 5 together with the die block sections 6, 6 are held in their respective upper positions. As hereinbefore stated, the plunger 3 carries pins 12 which are received in the respective slots 8a of the plates 8. As will be understood, this is a stop arrangement defining the limit of upward movement of the plunger 3.

In accordance with the invention, a plate P of the character illustrated in Figs. 9–12 inclusive is heated to suitable forging temperature as 2250 degrees, more or less and, with the movable die shoe 13 elevated, said plate P is disposed in supporting relation, by the fillets c, c on the respective, elevated backing blocks 5 and 5, Fig. 4, in such manner that the plate groove a faces upwardly and extends longitudinally of the die press. When thus disposed, the plate center line L and the groove a coincide with a vertical plane which extends symmetrically with respect to the die block sections 6, 6.

Thereupon, by suitable hydraulic, mechanical or drop forging means, not shown, the movable die shoe 13 is caused to descend whereby the lower edged surface 18a of the punch 18 comes into engagement with the upper surface of the plate P at its longitudinal center line L, such engagement being initially effected when the punch 18, in the zone of maximum punch height, enters the plate groove a.

As downward movement of the die shoe 13 continues, engagement of the punch edged surface 18a with the plate P at its center line L is effected progressively in opposite directions from the location of initial contact in the aforesaid zone of maximum punch height. This action continues until, eventually, the edged surface 18a of the punch 18 engages the plate P throughout the length thereof.

During the described downward movement of the die shoe 13, the punch 18 causes the plate P, throughout the length thereof, to progressively engage the die block sections 6, 6 at the respective surfaces 6a extending lengthwise thereof and then, throughout the plate length, to progressively engage the curved die block sections 6b which also extend lengthwise of the respective die block sections 6, 6.

In Fig. 5, the partially shaped blank is shown after it has been entirely withdrawn from the upper surfaces of the backing blocks 5, 5 and from the upper surfaces of the die block sections 6, 6. At this stage of the operation, the partially completed blank is of U-configuration throughout its length and the bottom of the U-section, throughout the length thereof, has a contour corresponding approximately with that of the edged surface 18a of the punch 18.

As the parts are positioned in Fig. 5, the horizontal surfaces of the die shoe 13 and the punch plate 16 have just come into engagement with the horizontal surfaces of the backing blocks 5, 5 while the horizontal surfaces of the gibs 19 and punch 18 have just engaged the horizontal surfaces of the backing blocks 5, 5 and the die block sections 6, 6. Further, at this time, the respective vertical inner surfaces 13a of flanges formed on the movable die shoe 13 have come into sliding engagement with the respective vertical outer surfaces 1b of the fixed die shoe 1. Still further, at this time, the plunger 3 is in its uppermost position where it remained during the described shaping operation.

As the final stage of the shaping operation, the die shoe 13 moves from the position shown in Fig. 5 to that shown in Figs. 6, 6a, 7 and 8. In so doing, the backing blocks 5, 5 together with the respective die block sections 6, 6 carried thereby are moved downwardly and toward each other to form a channel or pocket in which the blank is given its final shape, the movement last noted occurring by reason of the fact that the backing blocks 5, 5 are in engagement with the respective inclined surfaces 1a, 1a of the die shoe 1.

Initiation of the last noted movement of the die shoe 13 causes downward movement of the plunger 3. The pressure created in the hydraulic system by the descending plunger rods 4 causes the valve 27, Fig. 8a, to open. Thereafter, while the backing blocks 5, 5 continue to apply downward pressure to the plunger 3, the output of the pump 23 is by-passed to the tank 24 by way of the pipe 25.

The above noted movement of the die block sections 6, 6 toward each other causes them to coact with the punch 18 to complete the shaping operation on the partially completed blank. In so doing, the aforesaid rib b of the plate P is shaped to form the edge e1 of the completed blade section B, this edge e1 being destined to form one edge of the complete propeller blade. In Fig. 16, I have shown approximately the maximum depth of the edge e1. Toward the tip of the section B from the location of Fig. 16, the depth of the edge e1 decreases in a progressive manner and, similarly, the depth of said edge e1 progressively decreases in a direction extending toward the shank of the section B from said location of Fig. 16. As stated above, the rib b merges into the surface of the plate P at the location b1, Fig. 9. Hence, this location is the zone wherein the edge e1 merges into the surface of the section B. When the shaping operation is completed, the bottom of the channel or U-section throughout the length thereof including the edge e1, has final curved contour as illustrated in Fig. 6a. In view of the foregoing, it will be understood that the blade section B has channel configuration and that the channel sides or walls branch from the curved edge e1 throughout the length thereof. Further, these channel sides or walls, throughout the length of said blade section B, terminate in surfaces s1 which occupy a single plane disposed at right angles to the longitudinal plane of the blade section B.

As shown on the drawings, the punch 18 comprises an upper neck section 18b which extends from the tip of said punch 18 a distance corresponding with the length of one of the fillets c. The neck section 18b is symmetrical with respect to a vertical plane extending longitudinally through the central part of the punch 18. The aforesaid neck section 18b defines channels at the respective opposite sides of the punch 18 which have dimensions corresponding with those of the respective fillets c, c. As the die block sections 6, 6 approach and reach the final position shown in Fig. 6, the metal forming the fillets c, c, is shifted transversely whereby said fillets c, c are removed from the exterior surface of the blank and formed on the interior surface of the completed blank as indicated at c1 and c1, Figs. 15, 16 and 17, the respective channels of the neck section 18b being provided with this end in view.

Between the edge e1 of the completed blade section B and the fillets c1 and c1, the walls have uniform thickness except where the wall thickness gradually increases as defined by smooth curves, Figs. 15, 16 and 17, which merge into the edge e1 and fillets c1, c1 respectively.

Figure 3:
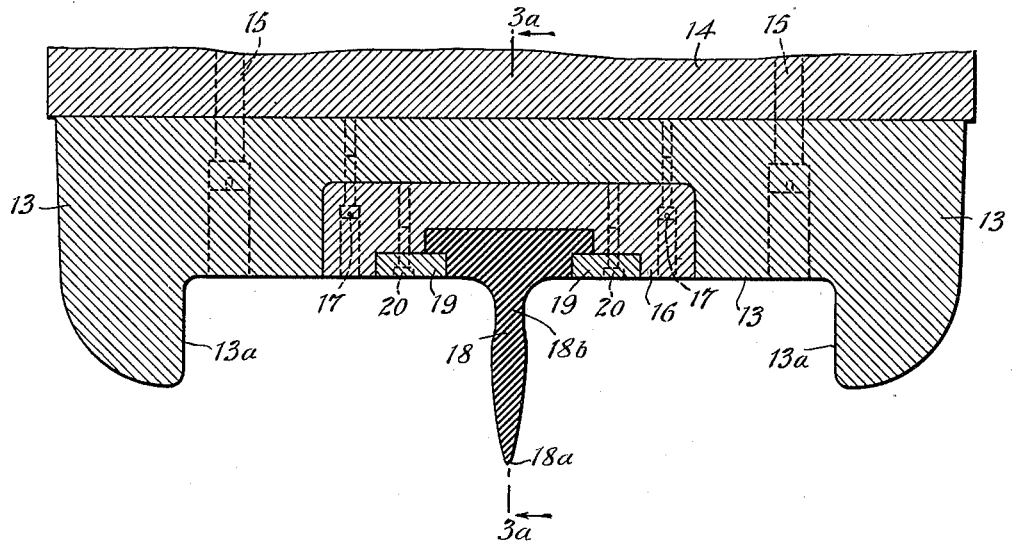
Fig. 3 is a transverse, vertical sectional view taken on the line 3—3 of Fig. 1 looking in the direction of the arrows.

After completion of the final shaping operation, application of force to the die shoe 13 is reversed with the result that said die shoe returns to the position thereof shown in Fig. 3. As soon as such return movement of the die shoe 13 is initiated, the pressure previously created in the hydraulic system by the descending plunger rods 4 is discontinued. As a result, the valve 27 closes and the pump 23 becomes effective to elevate the plunger 3 together with the thereby-carried backing blocks 5 and 5, the block sections 6 and 6 and the shaped blade section B which is disposed between the latter.

Referring to Figs. 13–17 inclusive, I have shown the completed blade section B which is free of propeller blade pitch and which is shaped, in accordance with the invention, as described above. The blade section B comprises the hemi-cylindrical shank section s1 which may extend as far as the line b—b, Fig. 13. Beyond the line b—b, toward the right, the blade section B has non-cylindrical channel configuration, the depth of the channel gradually increasing to a maximum extent at about the location of the transverse section, Fig. 16, and then gradually decreasing as the tip of the blade section B is approached. The edge e1 together with the changing heights thereof are illustrated in Figs. 15, 16, 17 as are the inner fillets c1, c1. As clearly appears, the exterior surfaces of the blade section B have suitable airfoil configuration and, as indicated in Figs. 13–17 inclusive, there is a longitudinally extending plane A with respect to which the exterior surfaces of said blade section B are symmetrically disposed. This is true by reason of the fact that any line extending perpendicular to the plane A and intersecting one side of said shaped section has the same length, between the plane A and the point of intersection, as the length of a straight-line extension of said line between said plane A and the point of intersection thereof with the opposite side of said shaped section.

The members 10, hereinbefore referred to, are disposed parallel with respect to the respective inclined surfaces 1a of the die shoe 1. During movement of the backing blocks 5, 5 as described above, they move freely with respect to the members 10 which, as stated, are secured to the respective plates 8. When the die press is of the vertical type as illustrated, the members 10 have no particular function and, hence, may be omitted. However, when the die press is of the horizontal type, the members 10 serve to retain the backing blocks 5, 5 in their respective operative positions.

It will be understood that the flanges of the movable die shoe 13 having the described inner surfaces 13a coact with the upper ends of the fixed die shoe 1 to effectively prevent the latter from spreading during the final shaping operation.

A particular advantage of the invention resides in the fact that the described die shaping or forging operation results in the production of smooth radii at the bottom of the channel defined by the blade section B and at the margins of the fillets c1, c1. This is highly desirable in the propeller blade art.

It shall be understood that the invention is not to be limited to a shaping operation performed on a plate of the character illustrated in Figs. 9-12 inclusive. Obviously, plates of other different shapes may advantageously be shaped or forged in accordance with the invention.

While the invention has been described with respect to the formation of a shaped section B as long (except for the tip) as the propeller blade to be produced, it shall be understood that the invention is not to be thus limited. If desired, for example, a pair of die presses may be provided, one of these forming a part of the disclosed shaped section and another forming the other part thereof.

It will be understood that the shaped section B is produced without propeller blade twist. It will also be understood that the die press may be of such character that it forms a complete half-section of the propeller blade including the tip.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

Forming apparatus comprising fixed and movable die members for producing an elongated shaped blank, said fixed member having an elongated longitudinally extending channel, the longitudinal side walls of which extend in converging directions toward the inner part of said channel, a pair of elongated die blocks movably mounted in said channel and movable toward and from each other along said converging sides in response to movement thereof into and from said channel, fluid pressure operated means tending to move said die blocks partly from said channel so as to cause said blocks to rise from the channel and to separate from each other, the protruding ends of said die blocks being adapted to support a blank workpiece, an elongated blade-like punch constituting an integral unit carried by the movable die member, said punch being movable toward and between said die blocks, said movable die member after movement of said punch between said die blocks engaging said protruding die blocks and moving them into said channel against said pressure means and thereby causing said die blocks to move toward each other so as substantially to enclose the aforesaid punch blade, and flange elements rigid with said movable die member engageable with the outer edges of said fixed die member as said movable and fixed die members are moved toward one another, whereby the fixed die member, having said channel therein, is constrained against lateral displacement by said flange elements as lateral stress is developed therein during die closing by the said movement of said die blocks toward one another.

WILLIAM R. DODDS.

REFERENCES CITED

The following references are of record in the file of this patent:

UNITED STATES PATENTS

| Number | Name | Date |
|---|---|---|
| 1,150,479 | Zwiker | Aug. 17, 1915 |
| 1,502,722 | Hill | July 29, 1924 |
| 1,561,556 | McMahon | Nov. 17, 1925 |
| 1,664,904 | Stanek | Apr. 3, 1928 |
| 1,766,098 | Booth | June 24, 1930 |
| 1,792,224 | Johnson | Feb. 10, 1931 |
| 1,823,557 | Bowen | Sept. 15, 1931 |
| 1,823,961 | Vogelsang | Sept. 22, 1932 |
| 1,880,454 | Klocke | Oct. 4, 1932 |
| 1,938,915 | Leighton | Dec. 12, 1933 |
| 2,231,772 | Nelson | Feb. 11, 1941 |
| 2,295,852 | LeJeune | Sept. 15, 1942 |
| 2,343,082 | Proctor | Feb. 29, 1944 |
| 2,350,884 | Ernst | June 6, 1944 |
| 2,473,673 | Bell | June 21, 1949 |